United States Patent [19]
Church, Jr.

[11] Patent Number: 4,865,349
[45] Date of Patent: Sep. 12, 1989

[54] AIR SUSPENSION DEFLATION CONTROL SYSTEM WITH AUTOMATIC REINFLATION AND CONTROL RESET

[75] Inventor: William P. Church, Jr., Fort Wayne, Ind.

[73] Assignee: Navistar International Transportation Corp., Chicago, Ill.

[21] Appl. No.: 146,932

[22] Filed: Jan. 22, 1988

[51] Int. Cl.4 ............................................. B60G 17/00
[52] U.S. Cl. ................................ 280/711; 280/DIG. 1
[58] Field of Search ......... 280/6 R, 711, 707, DIG. 1, 280/714; 180/41

[56] References Cited
U.S. PATENT DOCUMENTS

| | | | |
|---|---|---|---|
| 3,025,077 | 3/1962 | Alfieri | 280/711 |
| 3,074,739 | 1/1963 | Alfieri | 280/711 |
| 4,335,901 | 6/1982 | Gladish | 280/711 |
| 4,341,398 | 7/1982 | Condon et al. | 280/711 |
| 4,349,077 | 9/1982 | Sekiguchi et al. | 180/41 |
| 4,401,310 | 8/1983 | Ishikawa et al. | 280/6.1 |
| 4,558,886 | 12/1985 | Straub | 280/711 |
| 4,568,094 | 2/1986 | Lovell | 280/6 R |
| 4,630,840 | 12/1986 | Masuda et al. | 280/707 |
| 4,736,958 | 4/1988 | Armstrong | 280/711 |

Primary Examiner—Charles A. Marmor
Assistant Examiner—Ross Weaver
Attorney, Agent, or Firm—F. David Aubuchon; Dennis K. Sullivan

[57] ABSTRACT

A vehicle having an air suspension system including air bags supporting the rear cargo area thereof, a deflation control system with automatic reinflation and control reset for manually actuated lowering of the rear cargo area to the minimum height to facilitate loading and/or unloading to the ground. A manually operable control valve delivers an air pressure signal from a source to an inversion valve to exhaust the air from the air bags. A normally open electrically operated air solenoid is interposed between the control valve and the air supply and shuts off air flow to the control valve when the ignition switch is activated to restore air pressure to the air bags. The driver/operator can control the system only when the ignition switch is deactivated. Thus the system provides for operator actuable deflation and automatic reinflation and control reset.

7 Claims, 1 Drawing Sheet

AIR SUSPENSION DEFLATION CONTROL SYSTEM WITH AUTOMATIC REINFLATION AND CONTROL RESET

BACKGROUND OF THE INVENTION

This invention relates to cargo vehicles, such as rental trucks, of the type which are unloaded from the ground, as opposed to a loading dock, for example, when moving one's household furniture and, more particularly, to a pneumatic or air suspension therefor having a control system which provides for operator actuated lowering of the cargo bed to the minimum height above the ground to facilitate loading and unloading of the vehicle while automatically preventing operation of the vehicle with the cargo bed in the lowered position. Such a system would be used in place of hydraulic or electric lift attachments which may be expensive and improperly used by inexperienced operators.

Pneumatic suspension systems for larger vehicles such as tractor trailers, are well known and usually include one or more air springs at each end of each axle where the sprung mass (chassis, body and load) of the vehicle is supported on the unsprung mass (the wheels, suspension and axles) of the vehicle. Typically, the source of air pressure for such air suspension systems is the air brake system of the vehicle, including the air brake supply reservoir of the vehicle. It is known to allow for selective inflation or deflation of the air springs or air bags for raising and lowering the rear cargo area of the vehicle to align it with a loading dock to facilitate loading and/or unloading thereof. Conventionally, such systems utilize manually controlled valve means which are disposed at the rear of the vehicle so that the operator quickly can ascertain the position of the rear cargo area and control its position to achieve the desired elevation relative to the dock. This requires the presence of an operator at the rear of the vehicle as well as controls to facilitate adjustments to dock height.

Many vehicles are provided with automatic levelling systems for air suspensions. It is common in the art to provide override means for controlling the elevation of a vehicle relative to the axles of the vehicle. Such systems may include a regulating valve having an arm pivoted thereto and a fixed length link extending between the arm and the axle. As one end of the axle moves downwardly relative to the vehicle bed when the vehicle tilts, the link moves downwardly as does the arm on the regulating valve. The movement of the arm causes the valve to add or bleed pressurized air from the air bags effectively to position the vehicle bed to a condition whereat the vehicle bed is generally parallel to the axle and hence compensate for downward movement of the axle. Such alterations in clearance height between the sprung and unsprung masses tend to maintain the sprung mass generally parallel to the unsprung mass even though the unsprung mass moves upwardly or downwardly through a horizontal plane. U.S. Pat. No. 3,074,739 provides means selectively to override the levelling system of the type described by replacing the link in the automatic levelling system with a spring biased pneumatic cylinder which may be pressurized at will to override the automatic system. However, such type of patented system is complex, expensive and relies on springs as well as compressed air to operate and does not provide the precision control required. U.S. Pat. No. 4,335,901 provides a system which operates essentially independently of the vehicle's compressed air system although making use of such compressed air system to pressurize the air bags, if required For the link of U.S. Pat. No. 3,074,739, a cylinder and piston actuator is used which is connected to a master control via a conduit, the actuator chamber, the conduit and the master control chamber being filled with a compressible fluid. The master control chamber is varied in volume to produce a corresponding change in the actuator chamber resulting in relative movement between the actuator chamber and the piston, operating the regulating valve. The master control manually is operated selectively to effect pressurization or bleeding of the air bags to raise or lower the vehicle bed. The system taught by said last mentioned patent does not provide any suggestion for automatic reinflation of the air bags so that the vehicle cannot be driven with the air bags deflated. Further, no provision was made therein for automatic reset of the control system when the vehicle is placed in drivable condition. While a simpler and less expensive system than that of U.S. Pat. No. 3,074,739, the system of U.S. Pat. No. 4,335,901 yet was neither simple nor economical.

As a proposal for guarding against the operation of a deflation system while same is in the elevating or deflating condition, U.S. Pat. No. 4,558,886 provides a safety interlock in the air brake system of the vehicle but does not provide means for automatically reinflating the air bags when the loading or unloading is completed and before the vehicle is moved.

Another suggestion made in the prior art for providing a system for raising and/or lowering the front and/or rear of a vehicle having an air-bag suspension system can be found in U.S. Pat. No. 4,341,398 wherein a height-control valve was provided between the air reservoir and the air bags located at the end of the vehicle intended for selective raising and/or lowering and a by-pass valve is provided functioning to by-pass the height control valve. The by-pass valve is solenoid operated and is controlled by a sensing switch providing a return to the normal level when lowering to the desired level has been effected by operating selected exhaust valves operating upon the individual air bags concerned. While the operation suggested by the last mentioned patentee is driver controlled, there are no suggestions therein how automatically to assure that the air bags are reinflated before the vehicle is driven.

SUMMARY OF THE INVENTION

The invention provides a vehicle air suspension deflation control system with automatic reinflation and control reset. A dash-mounted control valve is coupled to an inversion valve in turn linked via conduit means to the air springs in the form of air bags at the rear axle of the vehicle. An electrically actuated air solenoid is coupled to the vehicle ignition and positioned between the air-supply means for the air suspension. Only when the ignition is in the off condition can the control valve be actuated to direct a pressure signal to the inversion valve means to cause said inversion valve means to exhaust the air supply within the air bags and effect lowering of the rear cargo area of the vehicle. Only when the ignition is in the "on" condition will the solenoid be energized to close off the supply of air pressure to the inversion valve means, which in turn will automatically cause air pressure to be directed from the air supply to reinflate the air bags via said inversion valve means. The inversion valve means further provides protection to the air brake system of the vehicle by allowing the operator/driver manually to shut off air flow to the air bags in the event of bag rupture. In addition, the inversion valve means serve to isolate the air pressure within the air suspension system in the event of diminishment of the air pressure reservoir, i.e. the air supply.

DESCRIPTION OF A PREFERRED EMBODIMENT

Figure 1:
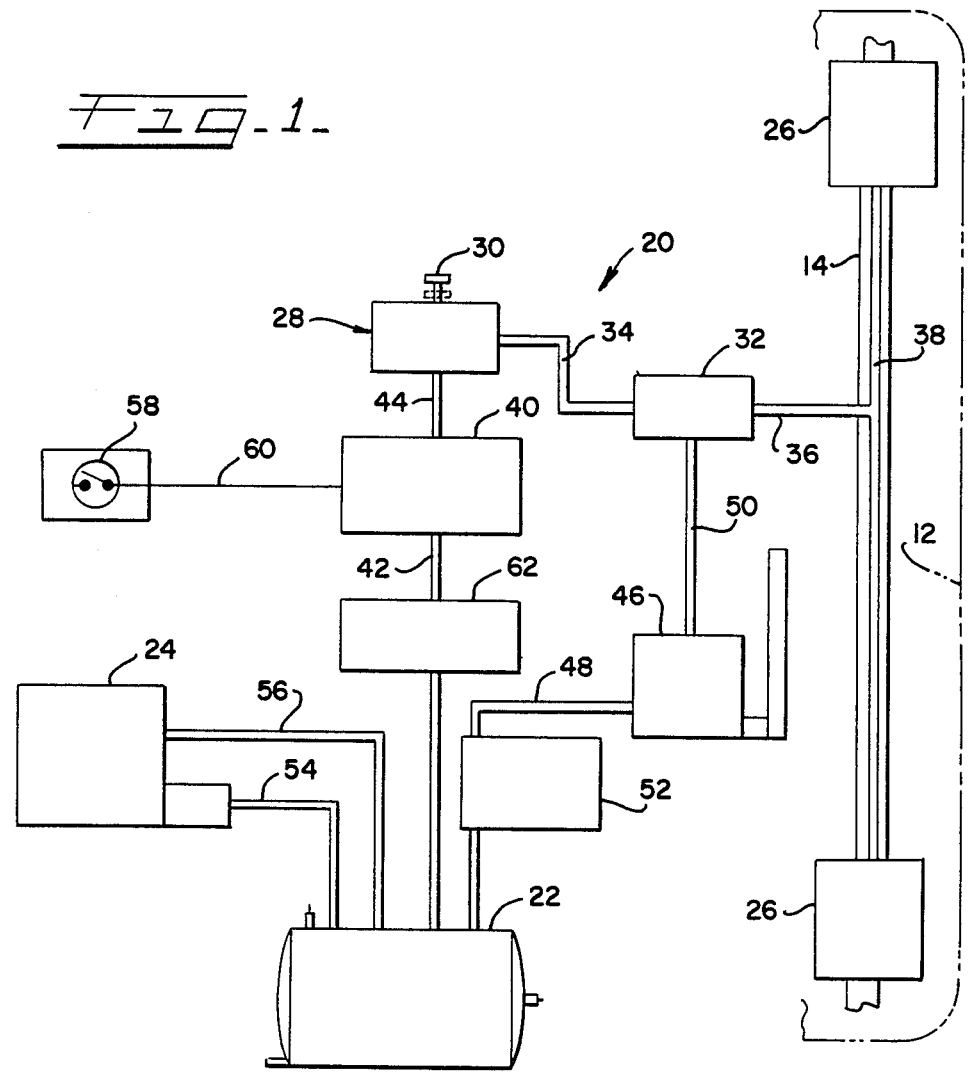
FIG. 1 is a diagrammatic representation of a vehicle having the deflation control system of the invention installed therein; and, FIG. 2 is a block diagram illustrating the air suspension deflation control system according to the invention.

The air suspension deflation control system according to the invention is intended for trucks, such as rental trucks of the type for moving household goods, and is illustrated diagrammatically in FIG. 1 and designated by reference character 10, said system enabling the driver/operator selectively to lower the rear cargo area 12 when the vehicle is stationary and the ignition is in the off condition so as to facilitate the loading and/or unloading thereof from the ground.

Figure 2:
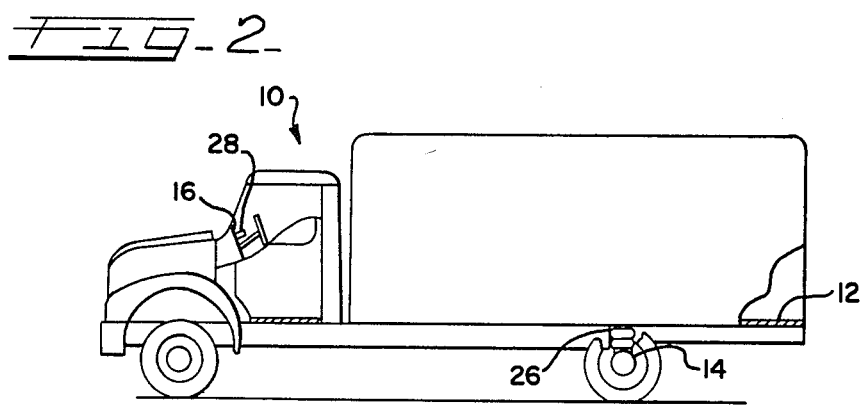

The system of the invention shall be described as incorporated in the pneumatic or air suspension system designated by reference character 20 in FIG. 2 where the air supply comprises an air reservoir 22 to which air pressure is directed from a conventional air compressor 24. The rear air suspension comprises a pair of air springs in the form of air bags 26 between the rear axle 14 of the vehicle 10 and the sprung mass represented by the rear cargo area 12 (shown in FIG. 2 by the fragmentary phantom representation). Control valve means, here a push-in pneumatic release valve 28, of the type used in air brake systems, provided with an actuator 30, is mounted on the dashboard 16 of the vehicle 10 and is operable between two conditions, first whereat the valve actuator 30 is pushed in and the second, whereat the valve actuator 30 is in outward position. The valve 28 is linked in pneumatic communication with an inversion valve 32 by conduit 34. The inversion valve 32 is linked in pneumatic communication with the individual air bags 26 by way of conduit 36 and branched conduit 38.

Electrically controlled air solenoid 40 is in pneumatic communication with the air reservoir 22 by way of conduit 42 and with the control valve 28, by way of conduit 44. A height control or leveling valve 46 is in pneumatic communication with the air reservoir 22 via conduit 48 and with the inversion valve 32 via conduit 50. The leveling valve 46 may include a check valve 52 at its inlet port to prevent air loss back through the system 20 in the event air reservoir pressure loss occurs. The air compressor 24, which supplies the air suspension system 20 as well as the service brake system (not shown), is coupled in pneumatic communication with the air reservoir 22 by conduits 54 and 56. The vehicle ignition switch 58 which starts and stops the vehicle engine (not shown) is coupled electrically to the air solenoid valve 40 by electrical line 60 for controlling same.

The deflation control system of the invention provides driver control of the rear suspension system to allow deflation of the air bags 26 which lowers the rear cargo area 12 as far as the vehicle suspension will permit whereby to facilitate loading and/or unloading without the use of electric or hydraulic lift attachments. When the vehicle 10 is brought to its static or parked condition, the driver turns off the ignition switch 58 stopping the engine. The air reservoir 22, having been supplied by the air compressor 24 during the operation of the vehicle 10, retains a supply of air pressure. With the ignition switch 58 off solenoid valve 40 is open and air pressure is directed to the control valve 28. The actuator 30 of the control valve 28 may then be manually pushed inward to release an air pressure signal to the inversion valve 32. The inversion valve 32 reacts to the air pressure signal by exhausting the air pressure contained within the air bags 26. Now the rear cargo area 12 supported by the air bags 26 is lowered to the minimum height permitted by the vehicle structure. In this embodiment, the operator has no control as to how far the cargo area is lowered and cannot raise the cargo bed except by turning on the ignition switch which deactivates the control valve 28 and causes the truck suspension to automatically resume its normal operating height.

It is undesirable that the vehicle 10 be driven with the air bags deflated. The air solenoid valve 40 is normally open when the ignition switch is "off". When the ignition switch 58 is turned on to start the engine, air pressure to the control valve is shut off by the solenoid valve 40 and air between the solenoid 40 and the control valve 28 is exhausted through the solenoid valve 40 and air pressure is restored to the air bags 26. Additionally, the dash mounted control valve 28 is arranged so that the actuator 30 is automatically pneumatically released and pops outward when the solenoid 40 is closed. Thus the control valve 28 automatically is reset to maintain the inflated condition when the ignition switch is turn on, even if the ignition switch is subsequently turned off.

Accordingly, the vehicle 10 is prevented from being driven with the rear air suspension in the deflated mode and the air bags 26 remain inflated when the ignition switch 58 is turned off, the control valve 28 being required to be manually operated to deflate the air bags 26. Since the system of the invention is operable to deflate the air bags only when the ignition switch 58 is in the "off" condition, the driver can control the deflation system only when the ignition switch 58 is off and the engine is stopped.

If desired, a low pressure detecting switch 62 can be interposed between the air solenoid 40 and the air reservoir 22 so that in the event the air pressure supply in the reservoir 22 drops below a predetermined value, indicators such as a warning lamp and perhaps, a sonic alarm system, (not shown) can be operated.

It should be understood that variations can be made to the deflation control system described herein according to the invention without departing from the spirit and scope of the invention as defined in the claims appended hereto.

I claim:

1. In a vehicle pneumatic suspension of the type including air spring means for supporting the rear cargo area of a vehicle having an engine, a pneumatic suspension deflation control system for lowering the rear cargo area of said vehicle to its minimum height from the ground to facilitate loading and/or unloading of the vehicle comprising ignition switch means for activating or deactivating said engine, control valve means, inversion valve means coupled between said control valve means and said air spring means, on engine driven source of pneumatic pressure, an air reservoir coupled to said air pressure source and to said control valve means, leveling valve means coupled to said inversion valve means and to said air reservoir, an electrically controlled valve coupled to said ignition switch means and arranged in the pneumatic path between said air reservoir and said control valve means, said control valve means operating exclusively between a first deflation condition directing pneumatic pressure to said inversion valve means and causing exhaustion of all pressure from said air spring means for deflating the suspension to minimum height and a second inflation condition closing off pneumatic pressure to said inversion valve means and directing pneumatic pressure to said air spring means from said air reservoir via said leveling valve means and said inversion valve means and inflating said air spring means, said electric valve means operating to permit said control valve means to be in the first condition only when said ignition switch means is deactivated to stop said engine and automatically operating to place said control valve means in the second condition when said ignition switch means is activated to start said engine to prevent operation of the vehicle when said air spring means is deflated.

2. The system as claimed in claim 1 in which said vehicle is provided with a dash board and both said ignition switch means and said control valve means are located on the dashboard accessible to the driver/operator of the vehicle.

3. The system as claimed in claim 1 in which said control valve means comprise a push-in pneumatic release valve.

4. The system as claimed in claim 1 and low pressure switch means interposed between said electric valve means and said air reservoir and operative in the event that the air pressure in said reservoir drops below a predetermined level and adapted to activitate an alarm system.

5. The system as claimed in claim 1 in which said leveling valve means includes a check valve to prevent loss of pneumatic pressure in said system in the event pressure loss occurs.

6. The system as claimed in claim 1 in which said control valve means is automatically reset from the first condition to the second condition when said ignition switch is activated.

7. The system as claimed in claim 1 in which said control valve means are manually actuated and automatically released.

* * * * *